A. J. MICHELIN.
MEANS FOR SECURING THE TIRES OF AUTOMOBILES AND OTHER VEHICLES.
APPLICATION FILED JULY 31, 1907.
927,266.
Patented July 6, 1909.
4 SHEETS—SHEET 2.
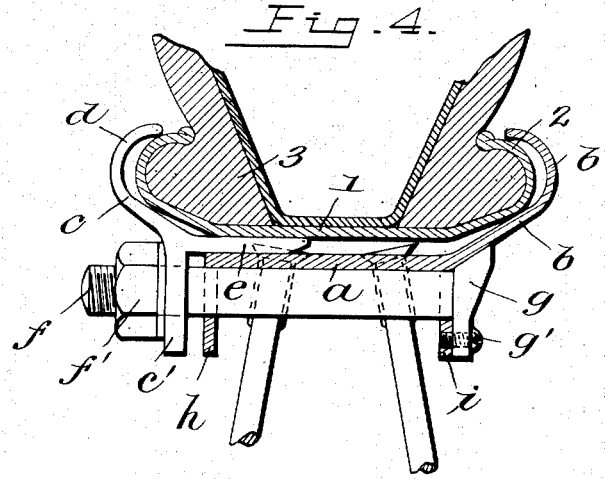
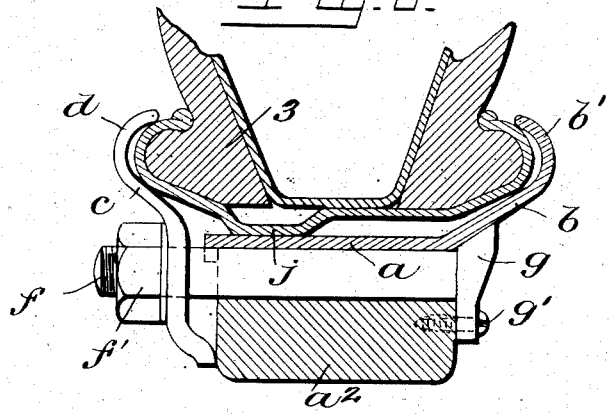
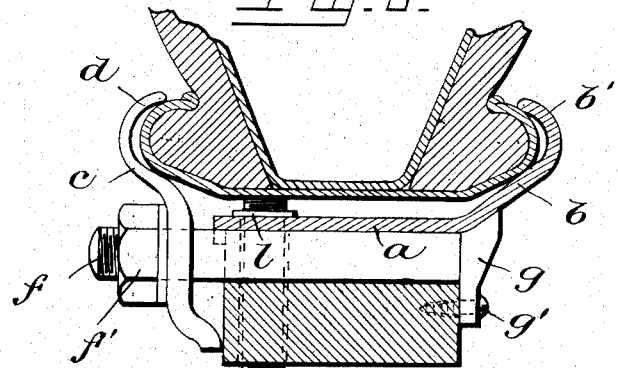

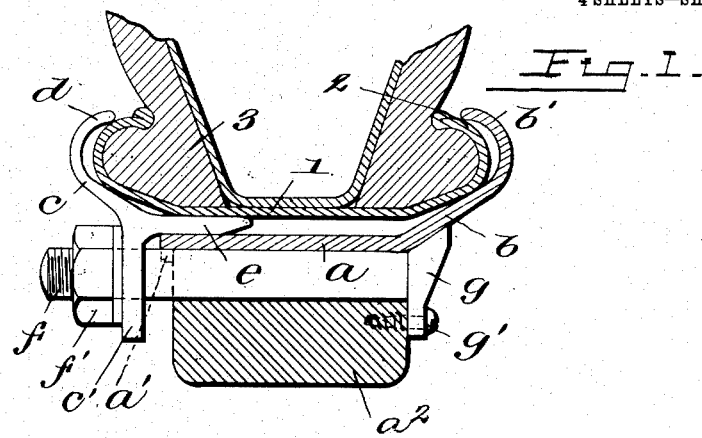
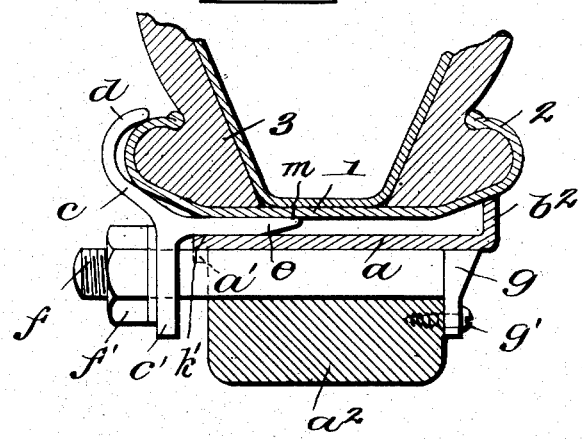
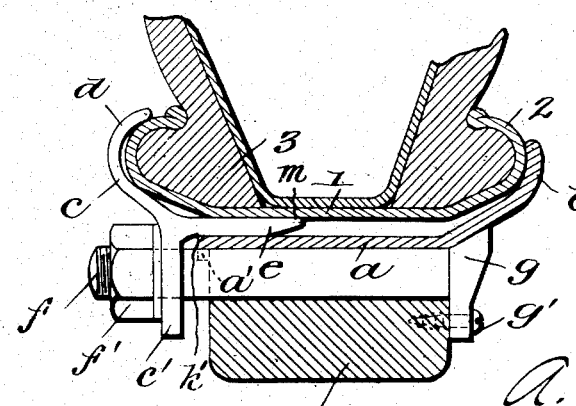

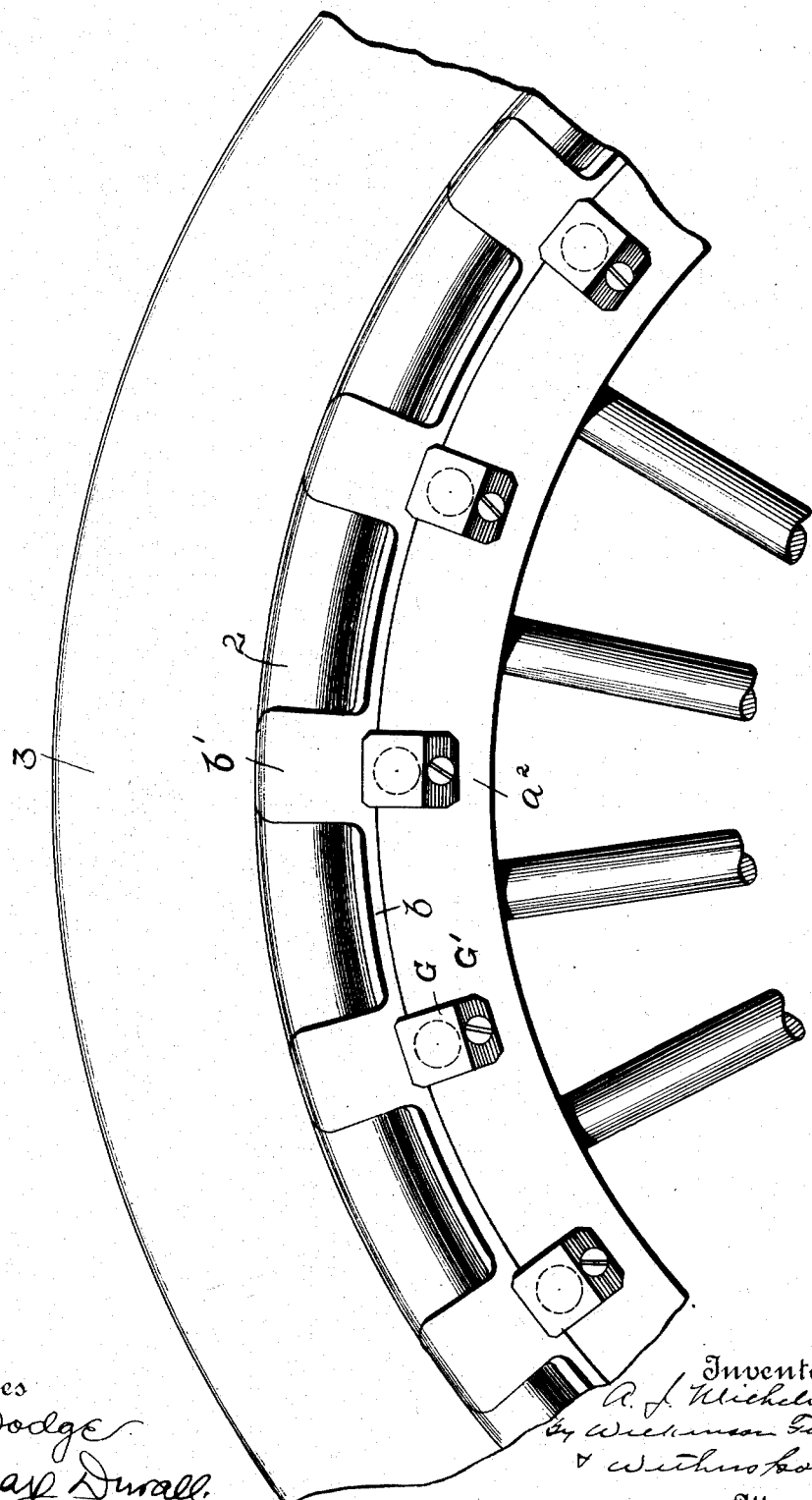

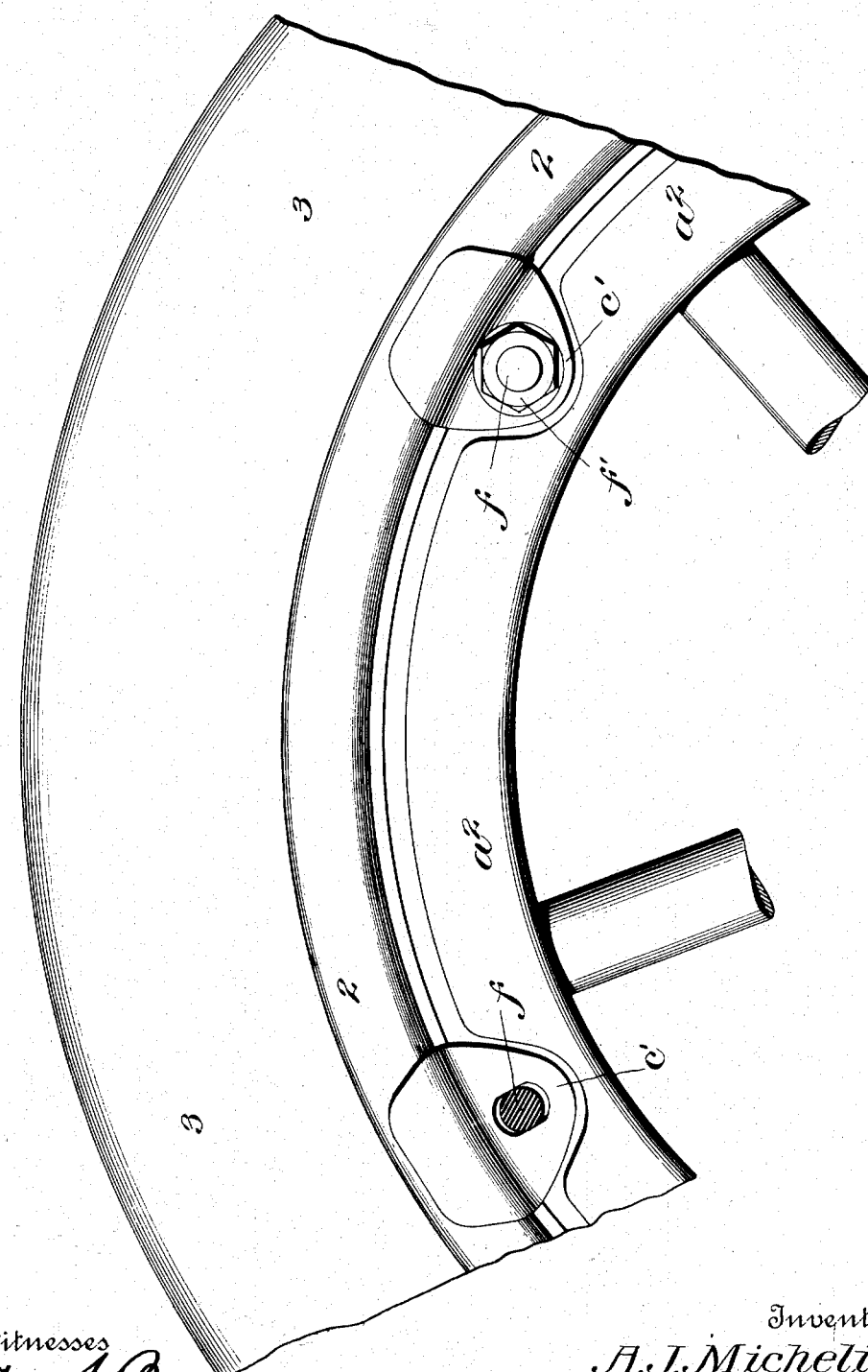

UNITED STATES PATENT OFFICE.

ANDRÉ JULS MICHELIN, OF CLERMONT-FERRAND, FRANCE.

MEANS FOR SECURING THE TIRES OF AUTOMOBILES AND OTHER VEHICLES.

No. 927,266.  Specification of Letters Patent.  Patented July 6, 1909.

Application filed July 31, 1907. Serial No. 386,471.

*To all whom it may concern:*

Be it known that I, ANDRÉ JULS MICHELIN, manufacturer, of the Republic of France, residing at Clermont-Ferrand, France, have invented certain new and useful Improvements in Means for Securing the Tires of Automobiles and other Vehicles; and I do hereby declare the following to be a full, clear, and exact description of the invention, such as will enable others skilled in the art to which it appertains to make and use the same.

My invention relates to improvements in tires and has for its object to provide means whereby an inflated vehicle tire, carried by a removable rim, may be secured to the fixed rim of the vehicle wheel.

It is well known that it is very difficult to apply a fully inflated tire to the rim of a vehicle wheel, especially when on the road.

This invention consists, broadly, in applying a removable rim carrying a fully inflated tire to the fixed rim of a wheel and securing it thereon by means of strong spring clamps, which clamps are carried on bolts passing under the fixed rim and each of which clamps has, preferably, a portion fitting in between the fixed rim and the removable rim.

In the accompanying drawings—Figure 1 is a transverse sectional view through the outside portion of a wheel, showing my invention applied thereto. Figs. 2, 3, 4, 5, and 6 are similar views, showing modified forms. Fig. 7 is a side view, showing part of a wheel, with my invention applied thereto. Fig. 8 is a side view of a portion of the wheel, partly in section, showing a modified form.

$a^2$ designates the felly, usually made of wood, and $a$ the fixed rim secured thereto, usually made of steel. In the form shown in Fig. 1, the fixed rim has a flat portion, extending the width of the felly, and an outwardly inclined portion $b$, terminating in curved portions $b'$, forming hooks against which one side of the removable rim may be forced, and serving as an abutment therefor.

1 designates the removable rim, preferably made of metal, as steel, and having inwardly curved flanges 2 for receiving and holding the inflated tire 3.

Each of the spring clamps which are used to hold the removable rim, carrying the inflated tire, consists of a horizontal tongue $e$, a vertical portion $c'$ and a curved portion $c$, $d$. The horizontal portion consists of a flat piece of metal, preferably steel, having its inner edge under beveled, so that it may be readily inserted between the fixed rim and the removable rim. The portion $c'$ is perforated, to permit the passage therethrough of the securing bolt, the perforation being larger than the bolt.

$f$ represents one of the securing bolts, which passes through the felly $a^2$, and is provided with a nut $f'$ and a head $g$, beveled off so as to fit against the part $b$ of the fixed rim and having an extension through which a screw $g'$ passes, securing the bolt head $g$ to the felly $a^2$. If desired, the part $i$ may be made as an extension projecting inwardly from the fixed rim, and the bolt $f$ may pass through a perforation in said extension as shown in (Fig. 4). The fixed rim $a$ is also provided with a projection $a'$, which extends inwardly, forming a shoulder against which one side of the felly $a^2$ rests.

The form shown in Fig. 2 differs from that shown in Fig. 1 in that the fixed rim $a$ has a projecting portion $b^2$ at right angles to the fixed rim, which projection forms an abutment for one side of the removable rim. Similarly the form shown in Fig. 3 differs from that shown in Fig. 1 merely in the shape of the abutment on the fixed rim.

In the form shown in Fig. 4, which is of the bicycle type of wheel, the felly is omitted and the fixed rim is provided with inwardly projecting extensions $h$ and $i$, and the bolts $f$ pass through perforations in said extensions.

In the form shown in Fig. 5, the spring clamps have no horizontal portions, but each is made of a piece of steel, the outer part of which is bent as in the previously described forms and the inner part of which is bent inwardly, to rest against the felly $a^2$. The removable rim, in this modification, has an inwardly extending rib $j$, to properly position the removable rim upon the fixed rim.

In the form shown in Fig. 6, the removable rim is made as in Figs. 1–4, the spring clamps as in Fig. 5, but bolts $k$ are provided passing through the felly $a^2$ and the fixed rim $a$ and adjustable in screw threaded openings $l$ therein. These bolts, in connection with the abutments on the fixed rim, serve to position the removable rim upon the fixed rim.

The operation is as follows: The parts being in the position shown, if it is desired to remove the outer rim, with the tire thereon, the nuts $f'$ are removed from the bolts $f$, the spring clamps slipped out and then the removable rim, carrying the tire, is slipped off the fixed rim. In putting on a new rim, with an inflated tire thereon, these steps are carried out in the reverse order.

It should be noted that the spring clamps are not wedges in any sense but are merely clamps. When the nuts $f'$ are screwed home, the inner part of the clamp contacts with the outer part of the removable rim in only two points, $c$ and $d$. The horizontal portion of the clamp $e$ is simply a flat plate, except that its edge is under beveled in order that it may be easily inserted between the removable rim and the fixed rim, and does not wedge the two rims apart from each other. Furthermore as the nuts $f'$ are screwed home, inasmuch as the lower part $c'$ of the clamp is practically unsupported, the pressure of the nut upon the clamp causing the clamp to strike the flange of the removable rim, would tend to make the clamp revolve about the inner part of the tongue $e$. The result is that these clamps exert a spring action (although they are made of strong pieces of steel) upon the removable rim and do not in any way act as wedges. The spring action exerted by the clamp on the nut is the combination of the action exerted by the removable rim and the clamp proportionately to their elasticity and to the deformation they take under the pressure exerted by the tightening of the nut. Referring to the form shown in Fig. 3, for example, before the nut $f'$ is tightened the points $c$ and $d$ are in contact with the removable rim. In tightening the nut, the upper part of the clamp itself cannot advance as it is blocked by the removable rim, which in turn is held by the opposite edge of the permanent rim. The internal part of the clamp is thus raised and the edge $m$ of the tongue $e$ rises until it comes in contact with the internal face of the removable rim 1. It is at this moment that the spring action commences to be exerted. A further tightening of the nut $f'$ forces the removable rim and the tongue $e$ to deform proportionately to their elasticity, and the more the nut $f'$ is tightened, the greater will be the deformation. Consequently, when all the clamps are spaced and properly tightened, there is exerted on the point $m$ of the tongue $e$ of each of these clamps a pressure directed toward the center of the wheel, which tends to revolve the clamp around the point $k'$ in the opposite direction from its first movement. This forces the lower part $c'$ of the clamp strongly against the nut $f'$ and prevents it from becoming loosened.

I claim:—

1. In a vehicle wheel, the combination of a fixed rim provided with a part which acts as an abutment, a removable rim carrying an inflated tire and adapted to be slipped over said fixed rim, fastening means located inside of said fixed rim, and a series of spring clamps secured by said fastening means and so shaped as to engage a part of said removable rim, whereby the latter is firmly held between the abutting portions of the fixed rim and said clamps, substantially as described.

2. In a vehicle wheel, the combination of the felly, a fixed rim carried thereby and having a part which acts as an abutment, a removable rim having an inflated tire thereon and adapted to be slipped over said fixed rim, bolts passing through said felly and provided with nuts, and a series of spring clamps mounted on said bolts, said clamps having portions adapted to engage said removable rim and force it against the abutment on said fixed rim, substantially as described.

3. In a vehicle wheel, the combination with the felly, of a metal rim fixed thereto, said metal rim having inwardly curved portions on one side which act as abutments, bolts passing through said felly inside of the fixed rim, a removable rim having inwardly curved flanges, an inflated tire carried by said removable rim, and a series of spring clamps each having a curved portion to engage one of the flanges on the removable rim, whereby said removable rim is firmly held between said clamps and the curved portion of the fixed rim, substantially as described.

4. In a vehicle wheel, the combination of the felly, a fixed metal rim carried thereby, said rim having an inwardly bent flange on one side engaging said felly, and on the other side being provided with inwardly curved flanges forming abutments, a removable rim having inwardly curved flanges, an inflated tire carried by said removable rim, bolts passing through said felly, each of said bolts being provided with a nut, and a series of spring clamps, each clamp having a horizontal tongue, a perforated vertical portion engaging one of said nuts, and a curved portion engaging one of the flanges of the removable rim, whereby as the nuts are screwed home, the removable rim is firmly held between said spring clamps and the projections on the fixed rim, substantially as described.

In testimony whereof, I affix my signature, in presence of two witnesses.

ANDRÉ JULS MICHELIN.

Witnesses:
  R. H. BRANDON,
  HANSON C. COXE.